US011365827B2

(12) United States Patent
Hainzer

(10) Patent No.: US 11,365,827 B2
(45) Date of Patent: Jun. 21, 2022

(54) TOILET TANK VALVE

(71) Applicant: Eric Hainzer, Woodbridge, VA (US)

(72) Inventor: Eric Hainzer, Woodbridge, VA (US)

(*) Notice: Subject to any disclaimer, the term of this patent is extended or adjusted under 35 U.S.C. 154(b) by 0 days.

(21) Appl. No.: 16/747,184

(22) Filed: Jan. 20, 2020

(65) Prior Publication Data
US 2020/0248832 A1 Aug. 6, 2020

Related U.S. Application Data

(60) Provisional application No. 62/801,794, filed on Feb. 6, 2019.

(51) Int. Cl.
*E03D 1/32* (2006.01)
*F16K 31/26* (2006.01)

(52) U.S. Cl.
CPC .............. *F16K 31/265* (2013.01); *E03D 1/32* (2013.01); *Y10T 137/7423* (2015.04); *Y10T 137/7433* (2015.04)

(58) Field of Classification Search
CPC ................. E03D 1/32; E03D 11/00–18; Y10T 137/7358–7501; Y10T 137/7297; Y10T 137/73; Y10T 137/7319; Y10T 137/7323; Y10T 137/7426; Y10T 137/7423; Y10T 137/6004; F16K 31/18–34; F16K 31/265; F16K 31/26
USPC ... 4/302–305, 368, 375, 376, 313, 406, 407, 4/414; 137/389, 390, 392, 409–454, 137/315.08
See application file for complete search history.

(56) References Cited

U.S. PATENT DOCUMENTS

| | | | | | |
|---|---|---|---|---|---|
| 376,137 | A | * | 1/1888 | Butler | F16L 19/0218 285/148.28 |
| 394,870 | A | * | 12/1888 | McGahan | G01F 23/02 73/328 |
| 500,412 | A | * | 6/1893 | McIntyre | F16L 15/008 285/148.6 |
| 655,380 | A | * | 8/1900 | Stroh | F16L 35/00 285/38 |
| 868,377 | A | * | 10/1907 | Wands | F16L 19/065 277/622 |
| 1,626,135 | A | * | 4/1927 | Fankhauser | E03D 11/17 285/148.19 |
| 2,021,317 | A | * | 11/1935 | McFarland | E03D 11/17 285/298 |
| 2,135,223 | A | * | 11/1938 | Scheiwer | F16L 37/23 285/111 |
| 2,565,572 | A | * | 8/1951 | Pangborn | F16L 37/23 285/277 |
| 2,631,602 | A | * | 3/1953 | Albright, Jr. | 137/418 |

(Continued)

*Primary Examiner* — Craig J Price
(74) *Attorney, Agent, or Firm* — Daniel M. Cohn; Howard M. Cohn

(57) ABSTRACT

An improved toilet fill valve designed to replace a damaged toilet tank valve within a toilet. The improved toilet fill valve includes a first quick connect coupling which separates an upper section of a pipe body mounted to a float from a lower section of the pipe body mounted to an opening located at a bottom of a cistern tank within the toilet. The first quick release coupling includes a female component threadedly attached to the upper section of the pipe body. The first quick release coupling includes a male component end that can be threadedly attached to the lower section of the pipe body.

5 Claims, 3 Drawing Sheets

(56) References Cited

U.S. PATENT DOCUMENTS

| | | | | |
|---|---|---|---|---|
| 3,554,219 | A * | 1/1971 | Hudson | E03D 1/32 137/414 |
| 3,797,518 | A * | 3/1974 | Holm | F16K 31/26 137/434 |
| 3,853,141 | A * | 12/1974 | Fischer | F16K 31/26 137/436 |
| 4,100,928 | A * | 7/1978 | Schoepe | F16K 31/34 137/15.18 |
| 4,180,096 | A * | 12/1979 | Johnson | E03D 1/32 137/403 |
| 4,182,364 | A * | 1/1980 | Gilbert | F16K 31/24 137/426 |
| 4,286,619 | A * | 9/1981 | Straus | F16K 31/26 137/426 |
| 4,600,031 | A * | 7/1986 | Nestich | E03C 1/102 137/218 |
| 4,646,779 | A * | 3/1987 | Johnson | F16K 47/02 137/426 |
| 4,709,721 | A * | 12/1987 | Gish | F16K 31/20 137/218 |
| 4,746,149 | A * | 5/1988 | Thompson | F16L 37/248 285/148.13 |
| 4,915,351 | A * | 4/1990 | Hoffman | F16L 37/23 251/149.1 |
| 4,922,556 | A * | 5/1990 | Roosa | E03D 1/32 137/426 |
| 5,035,257 | A * | 7/1991 | Antunez | F16K 31/34 137/414 |
| 5,472,244 | A * | 12/1995 | Nishikata | F16L 19/02 285/321 |
| 5,551,466 | A * | 9/1996 | De Pieri | F16K 1/12 137/1 |
| 5,598,865 | A * | 2/1997 | Musso | E03D 1/32 137/315.08 |
| 5,715,859 | A * | 2/1998 | Nichols-Roy | E03D 1/32 137/414 |
| 5,742,951 | A * | 4/1998 | Wright | E03D 1/00 4/331 |
| 5,788,291 | A * | 8/1998 | Williams | F16L 37/26 285/325 |
| 5,836,346 | A * | 11/1998 | Nichols-Roy | F16K 31/34 137/414 |
| 5,842,498 | A * | 12/1998 | Locke | E03D 1/32 137/315.07 |
| 6,027,097 | A * | 2/2000 | Humphreys | F16L 37/23 251/149.1 |
| 6,102,067 | A * | 8/2000 | Orlando | E03D 1/32 137/315.08 |
| 6,183,021 | B1 * | 2/2001 | Walsh | F16L 5/02 285/123.15 |
| 6,260,574 | B1 * | 7/2001 | Nichols-Roy | E03D 1/32 137/414 |
| 6,325,425 | B1 * | 12/2001 | Kierath | F16L 19/065 285/352 |
| 6,354,326 | B1 * | 3/2002 | Le | F16K 31/26 137/218 |
| 6,561,810 | B1 * | 5/2003 | Schellhardt | G09B 23/12 434/126 |
| 6,766,825 | B2 * | 7/2004 | Antunez | F16K 31/3855 137/315.08 |
| 6,866,298 | B2 * | 3/2005 | Molter | E03D 1/32 285/23 |
| 6,929,151 | B1 * | 8/2005 | Clayton | F41B 9/0009 141/346 |
| 7,121,594 | B2 * | 10/2006 | Molter | E03D 1/32 285/354 |
| 7,293,577 | B2 * | 11/2007 | Morrison | E03D 1/32 137/409 |
| 7,316,423 | B2 * | 1/2008 | Rochelle | F16L 19/0231 285/15 |
| 7,516,753 | B2 * | 4/2009 | Morrison | E03D 1/32 137/409 |
| 7,661,438 | B2 * | 2/2010 | Nichols-Roy | F16K 31/34 137/411 |
| 7,757,708 | B1 * | 7/2010 | Canfield | E03D 11/00 137/389 |
| 7,909,054 | B2 * | 3/2011 | Le | F16K 31/18 137/426 |
| 9,010,355 | B1 * | 4/2015 | Achez | B08B 3/04 137/238 |
| 9,464,420 | B2 * | 10/2016 | Magar | E03D 1/00 |
| 9,499,964 | B2 * | 11/2016 | Yamasaki | E03D 1/32 |
| 9,568,135 | B2 * | 2/2017 | Lehmann | F16L 37/24 |
| 9,683,685 | B2 * | 6/2017 | Ismert | E03C 1/021 |
| 10,436,358 | B2 * | 10/2019 | Ismert | F16L 19/0231 |
| 10,774,512 | B2 * | 9/2020 | Le | F16K 31/1266 |
| 2003/0106587 | A1 * | 6/2003 | Taylor | F16K 21/18 137/412 |
| 2004/0026923 | A1 * | 2/2004 | Molter | E03D 1/32 285/189 |
| 2004/0238777 | A1 * | 12/2004 | Yang | F16L 37/248 251/149.6 |
| 2005/0121079 | A1 * | 6/2005 | Huang | E03D 1/32 137/425 |
| 2007/0006923 | A1 * | 1/2007 | Smith | F16K 31/265 137/426 |
| 2008/0185842 | A1 * | 8/2008 | Blackman | F16L 15/006 285/376 |
| 2013/0068321 | A1 * | 3/2013 | Guthrie | F16K 21/18 137/434 |
| 2013/0074953 | A1 * | 3/2013 | Huang | E03D 1/32 137/409 |
| 2015/0122343 | A1 * | 5/2015 | Ismert | F16K 27/067 137/15.17 |
| 2016/0097474 | A1 * | 4/2016 | Settu | F16B 31/027 285/355 |
| 2016/0348347 | A1 * | 12/2016 | Gardetto | E03D 1/32 |
| 2018/0355676 | A1 * | 12/2018 | Persent | E21B 17/046 |
| 2019/0301648 | A1 * | 10/2019 | Leckner | F16L 37/084 |

\* cited by examiner

TOILET TANK VALVE

CROSS REFERENCE TO RELATED APPLICATIONS

This application claims the benefit of U.S. Provisional Patent Application No. 62/801,794 filed on Feb. 6, 2019, which is incorporated in its entirety by reference herein.

TECHNICAL FIELD OF THE INVENTION

The present invention relates to an improved toilet tank valve, and more particularly to a toilet tank valve that can be separated into two sections.

BACKGROUND OF THE INVENTION

The advent of indoor plumbing and flush toilets, and decades of use and gradual improvement started with simple plug and flapper tank valves that were levered open, to remain open while a full tank emptied, and a ballcock valve which was open whenever the water level in the tank was below a storage level. While the ballcock valve was open, part of its total flow was diverted to refill the bowl at the same time the tank was being refilled. That procedure remains the same to this day for systems which use stored water to flush the toilet.

Nearly every year there has been an improvement in some part of the conventional toilet flush systems. One of the major components of a toilet is the toilet tank valve which controls the level and refilling of water in the toilet tank to enable the flushing operation. Tank toilet valves have evolved into many forms of pivoted plates and floats. Ballcock valves have evolved from simple floats on a lever that pressed on a valve plate, to differential pressure actuated valves that require movement by the float of only a pin to open or close a very small bleed orifice for their control.

Generally, these valves are typically inexpensive which results in their frequent breakage or the like. In order to replace a toilet tank valve, it is necessary to disconnect the valve from its secured position within the bottom wall of a toilet tank. This replacement, typically, cannot be accomplished by the home do-it-yourselfer. In particular, special knowledge of plumbing and possession of the requisite tools is required. Unless care is taken, there is the potential of cracking the porcelain toilet tank resulting in greater expenses to be incurred than fixing the original problem. In addition, it is often difficult to shut off the water source at the toilet tank as the control valve is frequently frozen due to long periods of disuse. To this end, plumbers have been frequently employed at high cost, as well as delays, in obtaining replacement of the toilet tank valve.

SUMMARY OF THE INVENTION

According to embodiment of the present invention, there is disclosed an improved toilet fill valve designed to replace a damaged toilet tank valve within a toilet. The improved toilet fill valve includes a first quick connect coupling which separates an upper section of a pipe body mounted to a float from a lower section of the pipe body mounted to an opening located at a bottom of a cistern tank within the toilet. The first quick release coupling includes a female component threadedly attached to the upper section of the pipe body. The first quick release coupling includes a male component end that can be threadedly attached to the lower section of the pipe body.

According to another embodiment of the present invention, there is disclosed an improved toilet fill valve designed to replace a damaged toilet tank valve within a toilet. The improved toilet fill valve includes a second quick connect coupling which separates an end section of a pipe body mounted to a valve from an intermediate section of the pipe body surrounded by a float. The second quick release coupling includes a female component threadedly attached to the section of the pipe body extending from the valve. The second quick release coupling includes a male component end that can be threadedly attached to the intermediate section of the pipe body extending from the float.

According to still another embodiment of the present invention, there is disclosed an improved toilet fill valve designed to replace a damaged toilet tank valve within a toilet. The improved toilet fill valve includes a first quick connect coupling which separates an upper section of a pipe body surrounded by a float from a lower section of the pipe body mounted to an opening located at a bottom of a cistern tank within the toilet. The first quick release coupling includes a female component threadedly attached to the upper section of the pipe body. The first quick release coupling includes a male component end that can be threadedly attached to the lower section of the pipe body. A second quick connect coupling separates an end section of a pipe body is mounted to a valve from an intermediate section of the pipe body mounted to a float. The second quick release coupling includes a female component threadedly attached to the section of the pipe body extending from the valve. The second quick release coupling includes a male component end that can be threadedly attached to the intermediate section of the pipe body extending from the float.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader and should not in any way be interpreted as limiting.

DETAILED DESCRIPTION OF THE PREFERRED EMBODIMENTS

Figure 1:
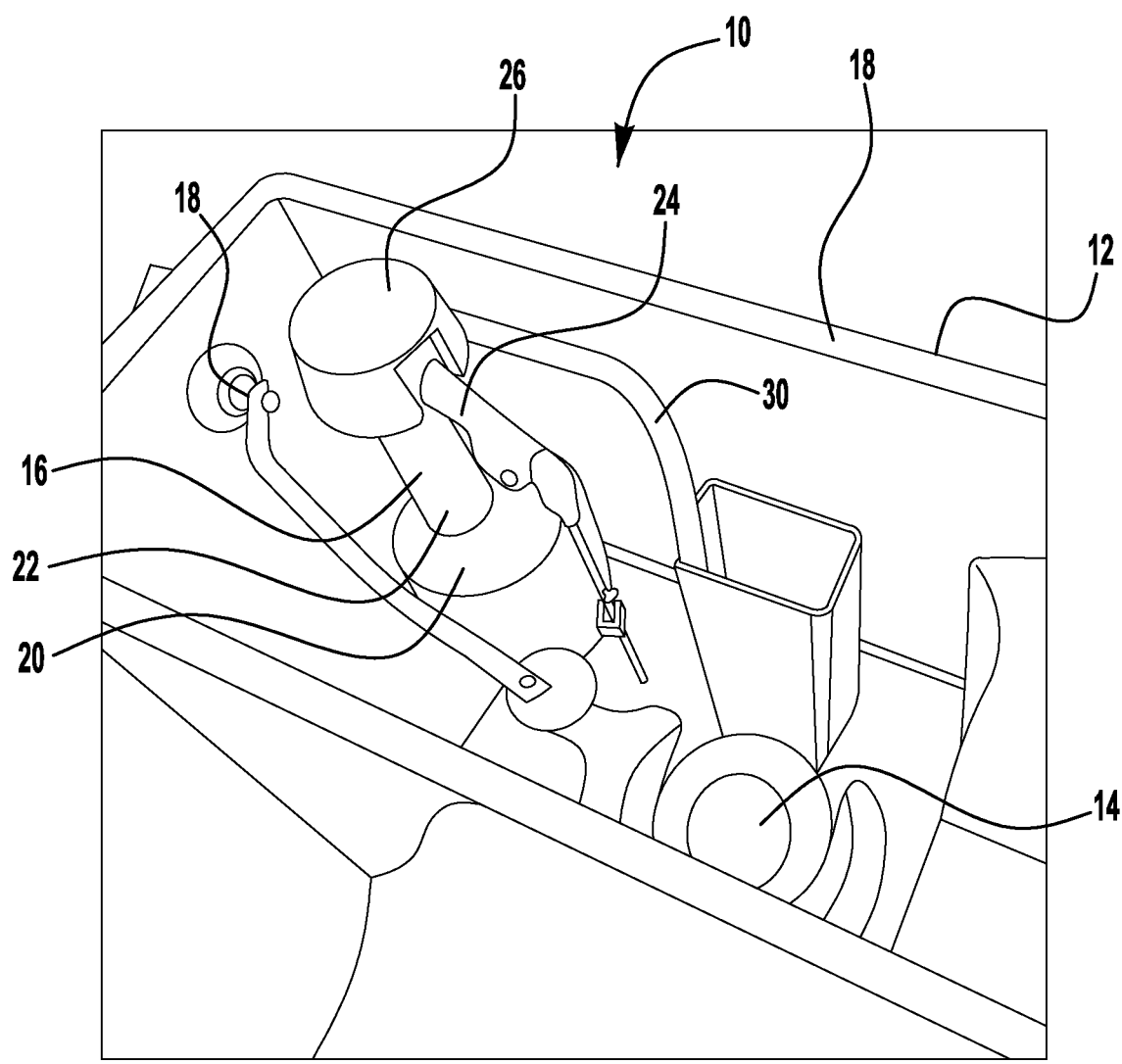
FIG. 1 is a three-dimensional, top view of the improved toilet tank valve located in a toilet tank, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

Many systems for controlling the flow of toilet tank water to a toilet bowl are known. Such systems have a water inlet valve connected to the tank that is typically controlled by a float that reacts to the tank water level. Depressing a trip lever or other actuator moves a flush valve at the tank outlet so that water can empty from the tank into the toilet bowl. As the tank water drains, an inlet valve float drops with the water level in the tank, thereby triggering inlet water flow to refill the tank. After sufficient tank water leaves the tank, the flush valve closes so that the water level in the tank can be re-established. As the tank refills after the outlet valve has closed, the supply valve float rises with the water and eventually closes the supply valve to shut off the intake of water from the water supply.

Traditionally, only a one piece, integrated valve/pipe device, is available to replace the used and often damaged toilet tank valve. It is not possible to replace only the valve portion of the damaged toilet tank valve since all its components are assembled together at the factory using a fusion bonding technique. This solid weld connection makes it impossible to separate the plastic components of the damaged toilet tank valve from each other. Replacing the valve involves breaking the seal where a pipe extending through the bottom of the toilet tank exits the toilet tank allowing any residual water still in the toilet tank to drain on the bathroom floor. In addition, the water supply line will normally need replacement due to movement resulting in damage to water seals and gaskets consuming additional time, materials, and expense.

FIG. 1 illustrates a three-dimensional, top view of a traditional toilet 10, found in approximately 225 million residential homes and small businesses. The toilet 10 is a self-contained system incorporating a cistern tank 12 housing a flapper valve 14, a toilet fill valve 16, and a flush handle 18 necessary to open the flapper valve properly. The flapper valve 14 is connected to the flush handle 18 and releases the stored water located inside the cistern tank 12 creating a siphon that initiates the flushing process.

Figure 2:
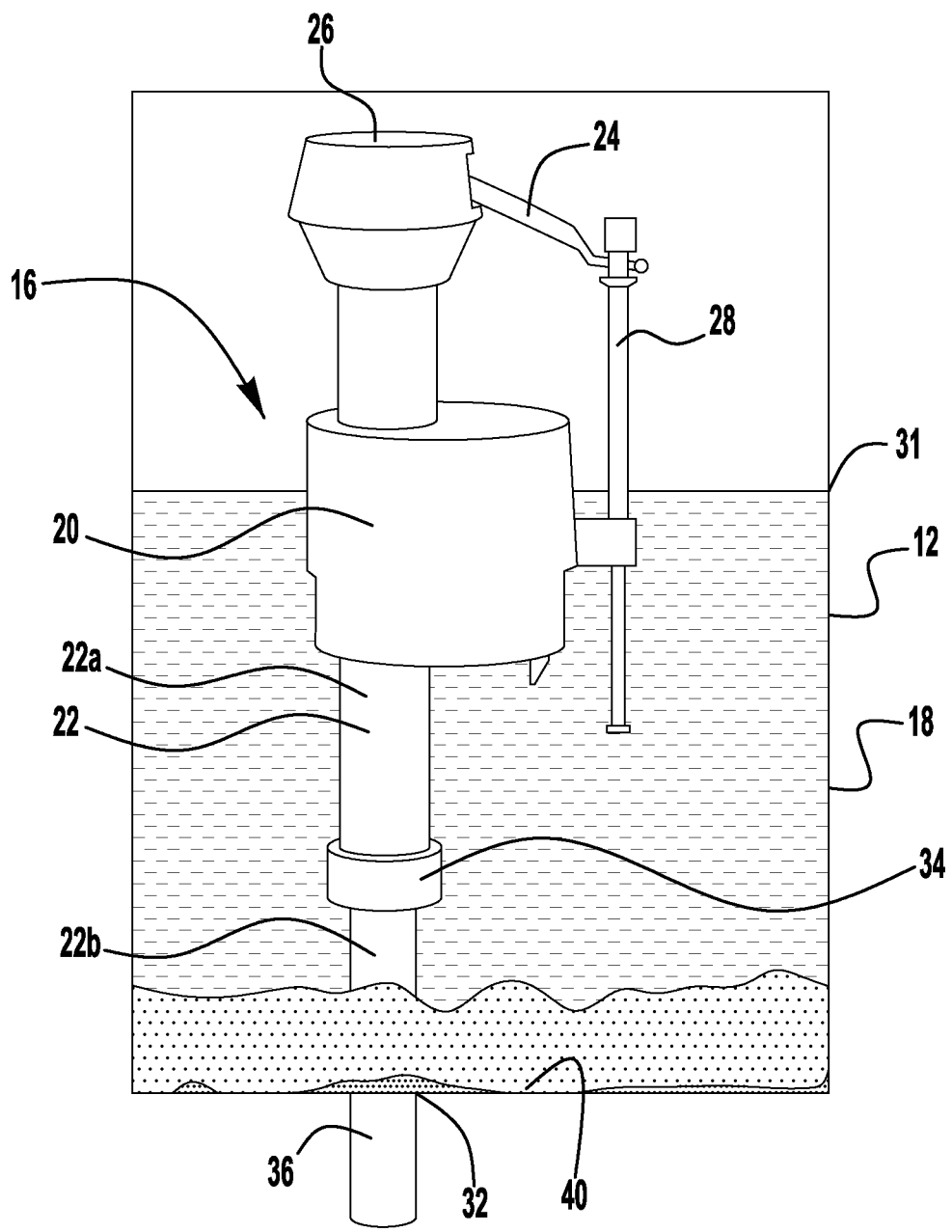
FIG. 2 is a side view of the improved toilet tank valve located in a toilet tank, in accordance with the present invention.
Figure 3:
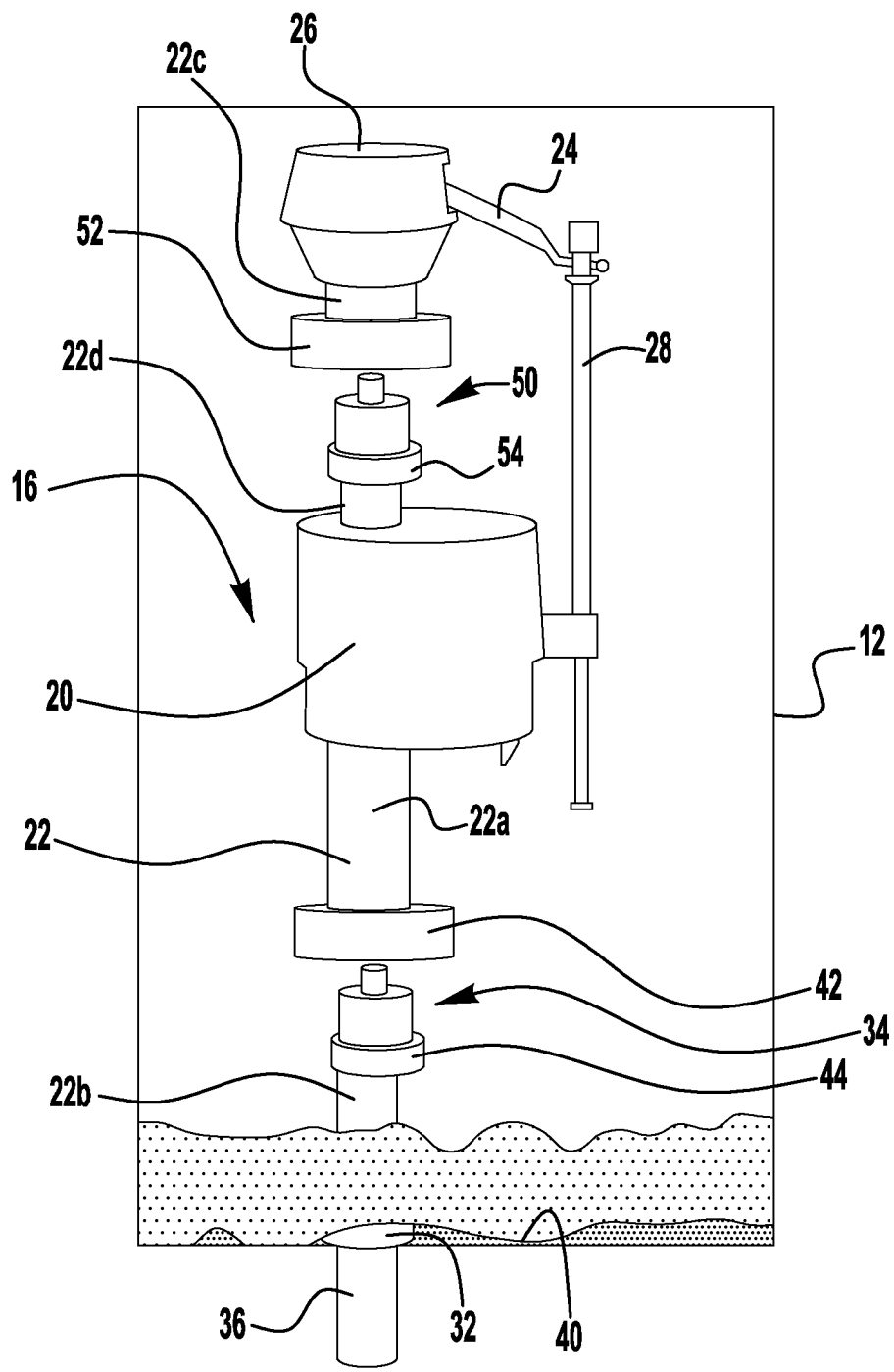
FIG. 3 is a side view of the improved toilet tank valve separated into two sections, in accordance with the present invention.

The lowering of a float 20 which rides on an elongated pipe body 22 during the flushing operation will cause a lever 24, as seen in FIGS. 2 and 3, to move downward by the rod 28 connected at one end to the lever 24 and to the other end to the float 20. The downward movement of the lever 24 opens the fluid valve 26 to allow water to flow up through the pipe body 22 and out of the pipe 30 into the interior of the cistern tank 12. Specifically, the purpose of the valve 26 is to regulate incoming water flow inside the cistern tank 12 and stop the incoming water flow when it reaches a preset level 31. Most cistern tanks 12 are directly connected to the water bowl bottom (not shown) and vary greatly in design and color.

The improved toilet fill valve 16, is designed to remedy the above-mentioned issue. In general terms, as seen in FIGS. 1 and 2, the improved toilet fill valve 16 incorporates a quick connect coupling 34 which separates an upper section 22a of the pipe body 22 from a lower section 22b of the pipe body 22. The lower section 22b of the pipe body 22 is mounted to an opening 32 located at the bottom of the cistern tank 12. The lower section 22b of the water pipe 22 can be adjustable to control the height of the quick connect coupling 34 and the water level 31 in the cistern tank 12. A threaded extension, i.e., a nipple 36, is mounted to the end of the lower section 22b of the pipe body 22 projecting out from opening 32 located at the bottom of the cistern tank 12. Since the water float 20 and the fill valve 26 are normally the failure points, separating the water float 20 and the fill valve 26 from the water pipe 22 into two individual parts so that they can be easily disconnected from each other will reduce cost, save time, and most importantly, reduce cleanup mess and water spillage.

As seen in FIGS. 2 and 3, the cistern tank 12 includes a bottom wall 40 having an opening 32 therethrough. Inserted through the opening 32 is a threaded extension or nipple 36. The threaded extension 36 extends outwardly of the cistern tank 12 and is directly connected a water supply.

The improved toilet fill valve 16 includes a first quick release coupling 34 including a female component 42 that can be threadedly attached to the end of an upper section 22a of the pipe body 22. Quick release coupling 34 further includes a male component end 44 that can be threadedly attached to the end of the lower section 22b of the pipe body 22. It is within the terms of the embodiment that the threaded extension 36 may also be integrally formed with the quick release connector 34 or provided as a separate nipple.

The first quick release coupling 34 may be constructed of a variety of types, such as those employing a male and female component. For example, the standard garden hose type quick release connector can be employed in accordance with the present invention. By separating the improved toilet fill valve 26 from the threaded extension 22b with a first quick release coupling 34, the upper section 22a of the pipe body 22 component including the float 20 and the valve 26 can be quickly and easily interchangeable without needing to remove the lower section 22b from the cistern tank 12. The simple manipulation of the quick release connector 34 by one's fingers will enable disconnection of the valve 14. This allows the upper section 22a of the pipe body 22 component including the float 20 and the valve 26 to be replaced without the necessity of mechanical tools. Further, the improved toilet fill valve 16 allows for a replacement without the breaking of any water seals.

It is within the terms of the embodiment that the improved toilet fill valve 16 can also include a second quick release coupling 50 including a female component 52 that can be threadedly attached to the end of an end section 22c extending from the valve 26 of the pipe body 22. Second quick release coupling 50 further includes a male component end 54 that can be threadedly attached to the end of an intermediate section 22d of the pipe body 22, extending from upper end 20a of the float 20.

It must be noted that it is considered that either one or both of the first quick release coupling 34 or the second quick release coupling 50 be incorporated into the present embodiment.

The second quick release coupling 50 may be constructed of a variety of types, such as those employing a male and female component. For example, the standard garden hose type quick release connector can be employed in accordance with the present invention. By separating the improved toilet fill valve 26 from the section 22*d* of the pipe body 22 with a quick release coupling 50, the upper section 22*c* of the pipe body 22 component including the valve 26 can be quickly and easily interchangeable without needing to remove the float 20, and sections 22*a* and 22*b* from the cistern tank 12. The simple manipulation of the second quick release connector 50 by one's fingers will enable disconnection of the valve 14. This allows the section 22*c* of the pipe body 22 including the valve 26 to be replaced without the necessity of mechanical tools. Further, the improved toilet fill valve 16 allows for a replacement without the breaking of any water seals.

It must be noted that aside from the aforementioned technical advantages of replacing only the mechanical valve there is also an environmental consideration as well. First, approximately ½ gallon of residual water is saved using the improved toilet fill valve 16 by eliminating the spillage of residual water. Although one valve change is not a significant water saving per unit, the totality of millions of replacement valves every year will result in significant savings of potable water provided by local city treatment facilities. Secondly, the amount of plastic is substantially reduced because there is less material to recycle at community land fill locations.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. An improved toilet fill valve designed to replace a damaged toilet tank valve within a toilet, comprising;
a first quick connect coupling which separates an upper section of a pipe body mounted to a float from a lower section of the pipe body mounted to an opening located at a bottom of a cistern tank within the toilet;
the first quick connect coupling including a female component threadedly
attached to the upper section of the pipe body and the first quick connect coupling includes the female component threadedly attached to an end of the upper section of the pipe body;
the first quick connect coupling including a male component end that can be threadedly attached to the lower section of the pipe body and wherein the first quick connect coupling includes the male component threadedly attached to the end of the lower section of the pipe body; and
wherein the first quick connect coupling includes a threaded extension integrally formed to the first quick connect coupling;
a second quick connect coupling which separates an end section of a pipe body mounted to a valve from an intermediate section of the pipe body surrounded by a float;
the second quick connect coupling including a female component threadedly attached to the section of the pipe body extending from a valve wherein the second quick connect coupling includes the female component threadedly attached to an end of the end section of the pipe body;
the second quick connect coupling including a male component end that can be threadedly attached to the intermediate section of the pipe body extending from the float;
wherein the female component has a larger diameter than a male component's diameter;
wherein the female component being threadedly attached to an end section extending from the valve of the pipe body;
wherein the second quick connect coupling includes the male component threadedly attached to the end of the intermediate section of the pipe body; and
wherein the male component end that is threadedly attached to the end of the intermediate section of the pipe body extends from an upper end of the float.

2. The improved toilet fill valve of claim 1, wherein a lower section of a water pipe can be adjustable to control a height of the first quick connect coupling and water level in the cistern tank.

3. The improved toilet fill valve of claim 1, wherein the female component and the male component of the first quick connect coupling are constructed of plastic.

4. The improved toilet fill valve of claim 1, wherein a lower section of a water pipe can be adjustable to control a height of the second quick connect coupling and water level in a cistern tank of the toilet.

5. The improved toilet fill valve of claim 4, wherein the female component and the male component of the second quick connect coupling are constructed of plastic.

* * * * *